United States Patent [19]
Gansert et al.

[11] 4,247,813
[45] Jan. 27, 1981

[54] ON-BOARD VEHICULAR ELECTRICAL POWER SUPPLY SYSTEM

[75] Inventors: Willi Gansert, Kornwestheim; Edgar Kuhn, Gerlingen; Harry Slansky, Mühlacker; Walter Kohl, Bietigheim-Bissingen, all of Fed. Rep. of Germany

[73] Assignee: Robert Bosch GmbH, Stuttgart, Fed. Rep. of Germany

[21] Appl. No.: 948,538

[22] Filed: Oct. 4, 1978

[30] Foreign Application Priority Data
Oct. 4, 1977 [DE] Fed. Rep. of Germany ....... 2744499

[51] Int. Cl.³ .............................................. H02J 7/14
[52] U.S. Cl. ......................................... 320/48; 322/99
[58] Field of Search ............................ 322/99; 320/48

[56] References Cited
U.S. PATENT DOCUMENTS

| | | | |
|---|---|---|---|
| 4,056,765 | 11/1977 | Scheidler et al. | 320/48 |
| 4,121,146 | 10/1978 | Hill | 322/99 X |
| 4,163,186 | 7/1979 | Haley | 320/48 |

OTHER PUBLICATIONS

"Voltage Monitor Uses Led Indicators," Moss, Electronic Design 19, 9-13-74, p. 176.
"Announcing the Battery Status Indicator-A New Led-/IC Combination," Litronix Advertisement, "Electronics" Mag., 7/25/74.

*Primary Examiner*—Robert J. Hickey
*Attorney, Agent, or Firm*—Frishauf, Holtz, Goodman & Woodward

[57] ABSTRACT

To permit elimination of separate exciter diodes of a vehicular three-phase alternator, and yet reliably ensure protection of the vehicular battery and provide an indication of discharge of the battery and hence possible failure of any excitation for the alternator, while additionally providing an indication of possible damage to the battery due to overvoltage conditions, the field of the alternator is separately excited from the battery through a voltage regulator connected to the main switch, and a low-voltage and high-voltage indicator is connected in parallel to the battery, preferably an LED triggered to illumination upon response of one of two threshold sensing circuits which sense undervoltage and overvoltage conditions of the battery beyond a predetermined voltage range.

4 Claims, 5 Drawing Figures

ON-BOARD VEHICULAR ELECTRICAL POWER SUPPLY SYSTEM

The present invention relates to an on-board vehicular electrical power supply system, and more particularly to such a system which uses an alternator, typically a three-phase alternator, in which the field is separately excited.

BACKGROUND AND PRIOR ART

Vehicular on-board power supply systems, for example automotive power supply systems, usually use self-excited three-phase alternators. The three-phase alternator has a three-phase rectifier network, preferably a full-wave rectifier network connected thereto to supply d-c power to a battery to keep the battery charged and supply loads therefrom. Usually, the rectifier includes a separate branch of a rectifier array which is provided to supply d-c to energize the field of the alternator. The field current itself is controlled by a voltage regulator. In an electronically controlled system, a power switching transistor is connected in series with the field, the power switching transistor forming part of the voltage regulator and being gated ON or OFF to supply current pulses to the field. The field itself is bridged by a free-wheeling or bypass diode to maintain current flow through the field during the OFF periods of the switching transistor. The positive terminal of the excitation voltage is usually referred to as the D+ terminal, the negative terminal as the D− terminal, and the connection point between field winding and switching transistor as the DF terminal.

Upon operation of the ignition switch, the supply to the battery is connected thereto and, at the same time, a charge indicator is activated. The charge indicator, usually, is a charge control lamp connected between the positive terminal of the vehicle battery, usually referred to as the B+ terminal and the D+ terminal. This charge control lamp indicates if current is flowing from the battery to the rectified output from the alternator, that is, indicates discharge of the battery and, additionally, is an indicator of trouble in the electrical system of the vehicle itself. The charge control indicator, typically an incandescent lamp, is customarily placed on the dashboard of the vehicle at a suitable location, frequently arranged together with other indicator lamps or apparatus.

The charge control lamp indicates if the battery is not being charged. Discharge of the battery, particularly for an extended period of time, must be indicated to the operator since, if no electrical power is available, ignition to the engine will fail. The battery can be damaged by rapid discharge. Batteries are sensitive, however, not only to excessive discharge, or to complete discharge state, but also to excessive charge. Supervisory apparatus which indicate overcharging of the battery have also been proposed. Such supervisory apparatus usually operates in the form of a bi-metal switch and prevents overcharging of the battery by interrupting connection to the alternator, or short-circuiting of the alternator. Such switches are so arranged that, after their response, it is no longer possible to operate the vehicle under emergency conditions.

Supervisory apparatus has also been proposed to indicate both overcharging and undercharging of a battery, usually in the form of a center-positioned ammeter. Use of pointer-type instruments on board of a vehicle is undesirable; the instruments cannot be made to indicate accurately due to the mechanical shocks and vibrations which are inherent in automotive applications. Use of pointer-type instruments additionally is undesirable since operators frequently overlook checking such meters, so that malfunction in the current supply system of the vehicle is not called to the operator's attention with sufficient emphasis.

Electronic supervisory control apparatus has also been proposed which, in case of trouble, cause a control lamp to light and to provide an indication to the operator that there is trouble in a current supply system. Such electronic apparatus usually is an additional or accessory item which requires additional wiring and connection. Output terminals of the electronic apparatus and connected to such an indicator usually must be well insulated to prevent any possible malconnection or short circuits, which increases cost and assembly of the vehicle and the electrical system therefor.

Determining the charge state of batteries, for example the type of secondary batteries used in automotive applications, is known; insufficient charge of the battery can occur due to overloading of the on-board vehicular network, or due to malfunction of the alternator, or of the voltage regulator connected therewith; overcharge of the battery can occur due to malfunction in the voltage regulator.

THE INVENTION

It is an object to simplify the on-board vehicular network by eliminating the separate exciter rectifier diodes and so arrange the network that the field excitation can be an external excitation derived directly from the battery. Realizing this object, however, requires that the operator always be aware of the operating state of the battery, that is, its charge condition and, hence, it is a further object of the invention to provide an indicator which indicates if there is trouble in the charge arrangement for the battery and, for example, if the battery is undercharged or being overcharged, and to so arrange the indicator and the network system that it is compatible with existing network supply practices so that costly changes are avoided.

Briefly, the main vehicular switch, typically the ignition switch, is connected to the battery on the one hand, and the voltage regulator terminal which controls the voltage regulator, on the other, and, further, to the field of the dynamo electric generator, typically the alternator, to provide separate, external excitation therefor when the volage regulator commands current flow through the field; this connection is combined with an indicator connected in parallel to the battery and providing an indication if the voltage varies beyond a predetermined voltage range, that is, to indicate either high-voltage or low-voltage condition of the battery beyond said range; in accordance with a feature of the invention, the indication of high voltage—indicative of overcharge—and the indication of low voltage—indicative of continued discharge of the battery—can be separate.

In accordance with a preferred embodiment of the invention, the indication is by means of a light emitting diode (LED) controlled by an electronic circuit which is combined in the same housing as the LED, the housing being formed in the shape of a lamp socket. The entire malfunction indicator thus can be inserted into a standard lamp socket in the dashboard of a vehicle without change of the electronic or electrical power circuitry of the vehicle.

Drawings, illustrating preferred examples:

Figure 1:
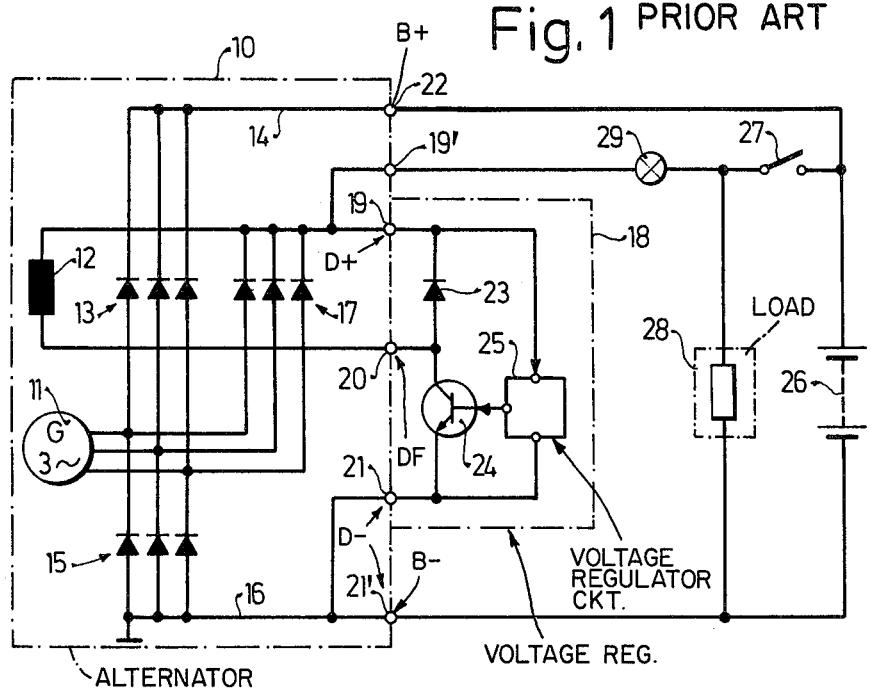
FIG. 1 is a general basic schematic diagram of the on-board network of an automotive vehicle in accordance with the prior art.

To reliably supervise operation of the on-board network of a vehicle, it is necessary to check if the battery is sufficiently charged, and additionally, it is necessary to check if the battery is not subject to abuse by overcharging. Insufficient charge of the battery can be due to overloading; excessive charge due to malfunction in the voltage regulator. Damage, or additional malfunction of equipment in the vehicle may, additionally, lead to damage of the battery.

A reliable indication for proper operation of the battery is its charge voltage. Providing an indication of the charge voltage, therefore, which responds both to low-voltage as well as excessive voltage conditions, will provide a reliable indication regarding the overall operability of the on-board vehicular network. Economics dictate, additionally, that the supervisory system be so made that it can be readily incorporated or integrated into the cabling of a motor vehicle and permit its integration into the dashboard or indicator panel on the motor vehicle without substantial changes.

The invention will best be understood when the standard circuits, well known in the prior art, are first reviewed, so that the difference will be apparent. Elements and circuits which are similar and operate similarly will be described but once and have been given the same reference numerals.

FIG. 1, prior art: A generator 10, constructed as a three-phase alternator 11 with an exciter or field winding 12, is connected over an array of positive power rectifier diodes 13 to positive bus 14 and over an array of negative power rectifier diodes 15 to a chassis, ground or reference bus 16. The alternator is self-excited and, to this end, has a group of positive exciter diodes 17 connected to the three-phase windings of the alternator and to the D+ terminal of the field 12. The diodes 17 provide excitation power. The current flow through the field 12 is controlled by a voltage regulator 18 which is connected over terminals 19, 20, 21 with the alternator 10. The terminal 19, forming the D+ terminal, has the positive excitation voltage applied; the field is connected between terminals 19 and 20, that is, between the D+ and DF terminals and terminal 21, the D− terminal is connected to ground or chassis, that is, to bus 16 which also forms the B− terminal and is frequently brought out as a separate terminal 21'. A bypass or free-wheeling diode 23, usually part of the voltage regulator 18, is connected in parallel to the field to maintain current flow when the control transistor 24 is gated off. A voltage regulator circuit 25, which may be of any well known construction, is connected to the D+ terminal 19, and having an output which controls the conduction of transistor 24. The operation of the control circuit 25 is well known. When the voltage at terminal D+ exceeds a predetermined or set value, the transistor 25 is gated OFF, to be gated ON again when the voltage drops below a predetermined value. When transistor 24 is ON, current can flow from the D+ terminal, DF terminal, through the transistor 24, and to the D− terminal.

The D+ terminal is connected to a second parallel terminal 19'. The positive output bus 14 is connected to an output terminal 22. Terminals 22 (B+) and 21' (B−) are connected to the battery 26 of the vehicle. The ignition or main switch 27 is connected between the positive terminal of the battery 26 and branch circuits leading to separately switched loads 28, schematically indicated merely as a resistor. Upon closing of the switch 27, the positive terminal of battery 26 is additionally connected through a charge control lamp 29 with the terminal 19' (D+). The charge control lamp 29 indicates malfunction or undercharging in the current suupply system of FIG. 1.

Operation: Let it be assumed that the alternator 11 is not in operation, and switch 27 is closed. Current will flow from the positive terminal of the battery 26 through the closed switch 27, charge control lamp 29, field 12 and switching transistor 24 (normally ON) to chassis, causing the lamp 29 to light. Only when the voltage at the terminal 19', that is, at the D+ terminal, is essentially equal to the voltage at the terminal 22, that is, at the B+ terminal, will the charge control lamp 29 extinguish. The brilliance of the charge control lamp will be an indication of the voltage difference between terminals 22 and 19'. Small voltage differences which, however, over an extended period of time may still cause discharge of the battery will not be indicated since the lamp 29, usually an incandescent lamp, will not light perceptively.

Figure 2:
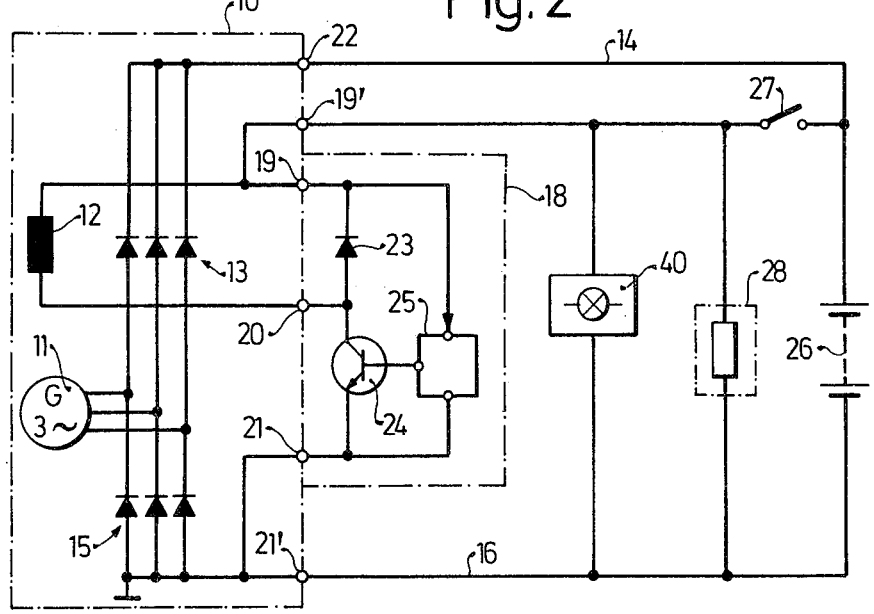
FIG. 2 is a general schematic diagram of the system in accordance with the present invention.

FIG. 2, network system of the present invention: The alternator system 10' is similar to the system 10 of FIG. 1 with this exception: There are no separate exciter diodes 17. The output terminals from the alternator system 19, 19', 20, 21, 21', 22 are identical to those of FIG. 1 except, of course, that the diodes 17 which are connected to the terminal D+, that is, terminal 19, are missing. The voltage regulator 18 is identical to that of FIG. 1. In accordance with the invention, the main switch 27 is directly connected to the terminal 19 or 19', respectively, and, further, a vehicle error voltage indicator 40 is provided, connected between terminal 19' and the chassis or ground bus 16. The voltage indicator 40 is described in detail below, and is preferably constructed as an integrated circuit and provides a signal if the voltage of battery 26 exceeds a first predtermined upper level or drops below a second predetermined lower level. The indicator 40 is so constructed that it will respond only to excess or low-voltage level conditions which persist beyond a predetermined period of time, and will not indicate short-time or short-voltage variations by suppressing stray voltage pulses extending in either excess or undervoltage direction. Additionally, the indicator circuit 40 is so arranged, in accordance with well known temperature response consideration, that the temperature characteristics of the battery are also considered.

In accordance with a feature of the invention, the voltage indicator 40 is constructed as a single unit which can be inserted in a dashboard of an automotive vehicle and which includes, in the very same unit, both a visual indicator as well as the entire control circuitry therefor, having only two output terminals. The requirement of connection to only two terminals which simultaneously provide power for the indicator, as well as the control voltage is of substantial advantage since additional cabling or separate non-standard sockets need not be used. Thus, indicator 40 can be a plug-in unit compatible with standard indicator sockets. As is clearly apparent from FIG. 2, only two terminals are needed for the indicator 40.

Figure 3:
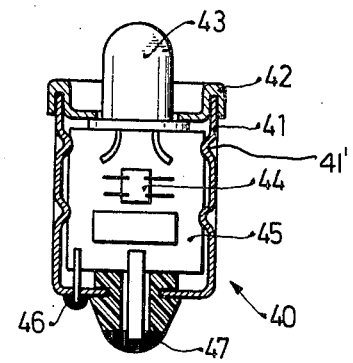
FIG. 3 is a longitudinal sectional view through a combined indicator-control circuit.

The construction of indicator 40 is best seen in FIG. 3. A socket 41 is formed with internally extending locating projection or holding buttons 41', for example in the form of punched or rolled internally projecting knobs which secure a holding plate 45 therein. The socket 41 has a cover 42 secured thereto which supports a light emitting diode (LED) 43. The electronic circuit of the unit 40 is contained in an integrated circuit (IC) 44 secured to the support plate 45 and held by the deformations 41'. The socket 41 is constructed in the form of a lamp socket and is connected at the bottom to terminals 46, 47. The shape of the socket is that of a standard vehicular indicator light bulb customarily used in connection with indicators on the dashboard of an automotive vehicle. This permits placement of the entire indicator unit at the same position of the dashboard of a vehicle in which the previous indicators were provided which merely indicate undercharging of the battery in accordance with the prior art (FIG. 1) and requiring separate excitation diodes, that is, the array 17. The arrangement thus permits ready incorporation of the system with existing cabling without further modificaion, and still provides an indication of erroneous voltage. Further protection against mechanical or elecrical damage is not needed.

Figure 4:
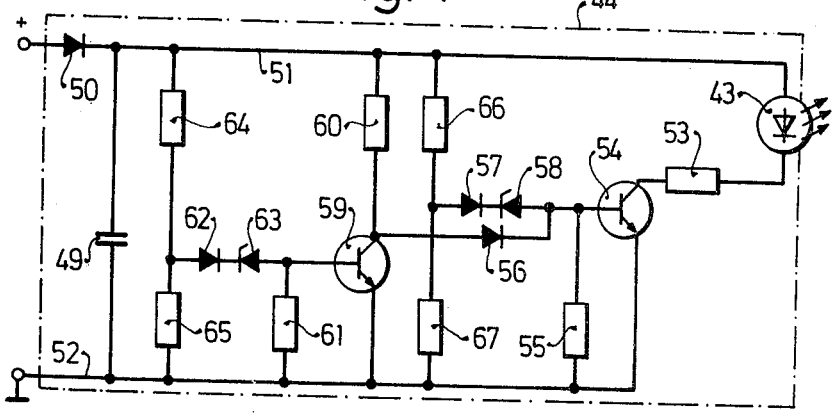
FIG. 4 is a detailed schematic circuit diagram of the control circuit.

FIG. 4, first embodiment of circuit: The circuit 44 preferably is an integrated circuit. The positive terminal connected, for example, to the switch 27 (FIG. 2) is connected through a reverse polarity protective diode 50 to positive line 51. The negative line 52 is connected to the negative terminal and hence to the B— terminal of the network. A protective capacitor 49, which also filters out stray voltage peaks, is connected between buses 51, 52. The indicator is an LED 43, connected in series with a resistor 53 in the emitter-collector path of a control capacitor 54 and between buses 51, 52. The base of transistor 54 is connected to chassis bus 52 through resistor 55 and, additionally, through a coupling diode 56 to the collector of a transistor 59; and further, through a diode 57 and a reversely poled Zener diode 58. The emitter of transistor 59 is connected to chassis bus 52, its collector to collector resistor 60 and to positive bus 51. The base of the transistor 59 is connected through a resistor 51 to negative bus 52, and through a series circuit of Zener diode 63 and diode 62 to the tap point of a voltage divider formed of resistors 64, 65, connected between buses 51, 52. The diode 57 is connected to the tap point of a voltage divider formed of resistors 66, 67, also connected between buses 51, 52.

The two circuits which control the base of the trasistor 54 are so arranged that the circuit which includes the transistor 59, functioning as an inverter, controls illumination of LED 43 in case of undervoltage, and thus forms an undervoltage sensing circuit; the Zener diode 58, connected to the voltage divider 66, 67, forms an overvoltage sensing circuit.

Operation: If the voltage between the plus and minus buses 51, 52 has a desired average value, for example 14 V, then the LED 43 should be extinguished. Upon dropping of the voltage below a predetermined level, or rise of the voltage above a predetermined level, LED 43 should light.

The resistors of voltage divider 64, 65 are so arranged that the voltage at the tap point is so high that the forward voltage drop of diode 62 and Zener diode 63 are overcome and transistor 59 will then become conductive. Conduction of transistor 59 drains control current which could be applied to the transistor 54 and thus causes transistor 54 to block or to be controlled in its OFF condition. Consequently, no current will flow through the collector-emitter path of transistor 54, and LED 43 will be dark. The voltage divider 66–67 is so dimensioned that the voltage at its tap point is insufficient to overcome the forward voltage drop of diode 57 and Zener diode 58. Transistor 54, thus, is not subject to control from the voltage divider 66–67 either if the voltage between the + (plus) and — (minus) terminals is of proper level.

Let is now be assumed that the voltage drops below a predetermined value. The low-voltage sensing circuit formed by voltage divider 64, 65, sensing elements 62–63 and transistor 59 will become active. The voltage divider 66, 67 and diodes 57, 58 will not affect the transistor 54 under those conditions, since the voltage at the tap point of the voltage divider 66–67 will become even more negative. The voltage at the voltage divider 64, 65, however, will also become more negative and transistor 59 accordingly will block. This causes the collector of transistor 59 to assume, essentially, the voltage level of bus 51, and diode 56 will couple this higher voltage to the base of the transistor 54. Transistor 4 will be gated ON, and current will flow through LED 43. The operator of the vehicle will receive an optical indication of malfunction, in this case malfunction due to undervoltage conditions.

Conversely, if the voltage should rise above a predetermined level, the transistor 59, controlled by diode 62 and zener diode 63, is not influenced since the voltage at the voltage divider 64, 65 will increase. The collector of transistor 59 thus will be at the low-voltage level due to its continued conduction. Transistor 54 is rendered conductive, however, over the control circuit formed by the voltage divider 66–67 and diodes 57, 58. When the voltage level at the tap point of the voltage divider 66, 67 rises to such a level that the voltages of diode 57 and the breakdown voltage of Zener diode 58 is exceeded, the base of transistor 54 will be controlled to a level which causes conduction thereof, and LED 43 will again light. Again, an optical indication of high-voltage condition is provided.

The indication of low-voltage and high-voltage condition will be rather sharp—that is, the voltage levels can be accurately set and LED 43 will either light or not. The operator is thus positively warned even of incipient trouble.

Figure 5:
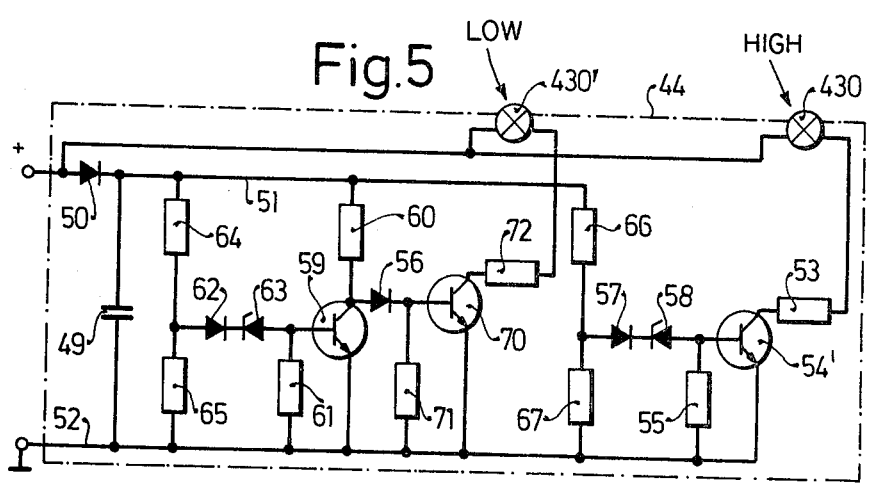
FIG. 5 is a schematic diagram of an embodiment of the control circuit illustrating separate overcharge and undercharge conditions.

Embodiment of FIG. 5: Basically, the embodiment of FIG. 5 is similar to that of FIG. 4 except that two separate indicators 430 and 430' are provided to indicate, respectively, high and low-voltage conditions. The sensing circuits of FIG. 4 are applied to separate outputs, that is, to two LED's or, as shown, incandescent lamps 430, 430', to provide respectively separate outputs based on sensed undervoltage or overvoltage condition.

The difference between the circuit of FIG. 4 and 5, in which similar parts have been given similar reference numerals, is that the collector of transistor 59 is coupled by diode 56 to a separate switching transistor 70, having a base resistor 71 and a collector resistor 72 which controls illumination of indicating lamp 430' for indication of low-voltage condition. The lamp 430' can be of the miniature type to fit into a single housing as shown in FIG. 3 and, for example, can have a color which differs from the lamp 430, in the same housing, controlled by the transistor 54' identically to the transistor 54 of FIG. 4.

Operation: Analogous to the circuit of FIG. 4, an average or proper voltage between buses 51, 52 causes transistor 59 to become conductive and transistor 70 and transistor 54 to be blocked. Neither of the lamps 430, 430' will be controlled to incandescence. When the applied d-c voltage between buses 51, 52 drops below a predetermined level, transistor 59 will block, transistor 70 will become conductive, and lamp 430' will light. If the voltage rises above a predermined level, transistor 54' will be conductive, and lamp 430 will light. Lamp 430' will remain dark.

The LED 43 (FIG. 4) can, of course, be replaced by an incandescent lamp; the lamps 430, 430' (FIG. 5) can equally be replaced by LED's which, preferably, have different color output. When located in the same housing, they may additionally be separated by an opaque divider which has a specific position with respect to the contact button 46 so that upon insertion of the unit into its socket, the low and high indicating positions can be additionally separated.

Various changes and modifications may be made, and features described in connection with one of the embodiments may be used with the other, within the scope of the inventive concept. Other illumination indicators may be used.

The temperature characteristics of the battery are automatically compensated by the temperature characteristics of the semiconductor elements in the circuit, which are exposed to essentially the same ambient temperature conditions as the battery.

We claim:

1. On-board vehicular electrical power supply system having a separately excited dynamo electric generator system furnishing a d-c output,
   the dynamo electric generator system including a dynamo electric generator (11) having a field winding (12) and a voltage regulator (18) controlling current flow through the field winding,
   a storage battery (26) connected to the output of the dynamo electric system,
   and a switch (27) interconnecting the dynamo electric system and the battery,
   connection means connecting the switch (27) between the battery (26) and the voltage regulator (18) to supply the control voltage thereto and additionally provide power to the field when the voltage regulator commands current flow through the field (12),
   two-terminal indicator means (40) connected in parallel to the battery and providing an indication when the voltage of the battery varies from a predetermined voltage level range and indicating either high-voltage or low-voltage condition of the battery beyond said range;
   said indicator means comprising
   a two-terminal lamp socket (41, 42);
   a luminous indicator (43) in the lamp socket;
   a dual voltage sensing circuit connected to the terminals of the lamp socket and deriving operating power from said lamp socket terminal, retained in the lamp socket, and providing two discrete "off-voltage" signals, one signal being indicative of over-voltage and the other signal indicative of under-voltage condition, including
   a switching transistor (54) having its emitter-collector path connected in series with the luminous indicator (43), said series circuit being connected across the two temrinals of the socket;
   a "low" sensing branch circuit (64–65; 62, 63, 61; 59; 56) including an inverting transistor (59) connected across the two terminals of the socket; a "high" sensing branch circuit (66, 67, 58; 57) connected across the two terminals of the socket;
   and coupling means (56, 57) independently coupling both said branch circuits, disjunctively, to the control electrode of the switching transistor controlling illumination of said luminous indicator.

2. System according to claim 1, wherein the luminous indicator is a light-emitting diode (LED) (43).

3. On-board vehicular electrical power supply system having a separately excited dynamo electric generator system furnishing a d-c output,
   the dynamo electric generator system incuding a dynamo electric generator (11) having a field winding (12) and a voltage regulator (18) controlling current flow through the field winding,
   a storage battery (26) connected to the output of the dynamo electric system,
   and a switch (27) interconnecting the dynamo electric system and the battery,
   connection means connecting the switch (27) between the battery (26) and the voltage regulator (18) to supply the control voltage thereto and additionally provide power to the field when the voltage regulator commands current flow through the field (12),
   two-terminal indicator means (40) connected in parallel to the battery and providing an indication when the voltage of the battery varies from a predetermined voltage level range and indicating either high-voltage or low-voltage condition of the battery beyond said range;
   said indicator means comprising
   a two-terminal lamp socket (41, 42);
   two luminous indicators (430, 430') located in said lamp socket, one to indicate "low voltage" conditions and the other to indicate "excessive voltage" conditions in the electrical power supply system;
   a dual voltage sensing means connected to the terminals of the lamp socket, deriving operating power from the terminals of the lamp socket, retained in the lamp socket, and providing two discrete "off-voltage" signals including
   a "low voltage" sensing branch circuit (64, 65; 62, 63, 61; 59; 56) including an inverting transistor (59) connected across the two terminals of the socket and further including a switching transistor (70) having its emitter-collector path connected in series with the "low voltage" luminous indicator (430'), said series circuit being connected across the two terminals of the socket;
   and an "excess voltage" sensing branch circuit (66, 67, 58, 57) connected across the two terminals of the socket and further including a switching transistor (54') having its emitter-collector path connected in series with the "excess voltage" indicator (430), said series circuit being connected across the two terminals of the socket.

4. System according to claim 3, wherein both said indicators (430, 430') are light-emitting diodes in a common housing (43).

* * * * *